United States Patent
Watfa et al.

(10) Patent No.: US 10,925,067 B2
(45) Date of Patent: Feb. 16, 2021

(54) SYSTEM AND METHODS FOR HANDLING PRIORITY SERVICES CONGESTION

(71) Applicant: InterDigital Patent Holdings, Inc., Wilmington, DE (US)

(72) Inventors: Mahmoud Watfa, Saint Leonard (CA); Pascal M. Adjakple, Great Neck, NY (US); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/197,867

(22) Filed: Nov. 21, 2018

(65) Prior Publication Data
US 2019/0098634 A1    Mar. 28, 2019

Related U.S. Application Data

(63) Continuation of application No. 15/033,620, filed as application No. PCT/US2014/063261 on Oct. 30, 2014, now Pat. No. 10,178,678.
(Continued)

(51) Int. Cl.
*H04W 72/04* (2009.01)
*H04W 28/02* (2009.01)
(Continued)

(52) U.S. Cl.
CPC ......... *H04W 72/0486* (2013.01); *H04W 4/14* (2013.01); *H04W 28/0205* (2013.01);
(Continued)

(58) Field of Classification Search
CPC ... H04W 72/0486; H04W 76/10; H04W 4/14; H04W 28/0205; H04W 48/08; H04W 48/16; H04W 28/12; H04W 76/16
(Continued)

(56) References Cited

U.S. PATENT DOCUMENTS 6,134,443 A    10/2000   Spann et al.
8,072,953 B2 * 12/2011  Mukherjee ............ H04W 12/06
                                                       370/338
(Continued)

FOREIGN PATENT DOCUMENTS

EP        2503838 A2     9/2012
JP     2012-529806 A    11/2012
(Continued)

OTHER PUBLICATIONS

3rd Generation Partnership Project (3GPP), R2-114159, "EAB Mechanism for RAN Overload Control in UMTS", Qualcomm, 3GPP TSG-RAN WG2 Meeting #75, Athens, Greece, Aug. 22-26, 2011, 12 pages.
(Continued)

*Primary Examiner* — Mong-Thuy T Tran
(74) *Attorney, Agent, or Firm* — Condo Roccia Koptiw LLP

(57) ABSTRACT

Techniques for congestion management in a communication network are contemplated. For example, a wireless transmit receive unit (WTRU) may include a Radio Resource Control (RRC) layer and a Non-Access Stratum (NAS) layer. The RRC layer may receive an indication for a service, for example from the NAS. The indication may be interpreted as a request for the particular service indicated. For example, the indicated service may correspond to at least one of: a mobile originated (MO) voice communication, a circuit switched fallback (CSFB) supplementary service (SS), or a MO short message service (SMS). The RRC layer may receive a signal from a network indicating that one or more services provided by the network are allowed. The RRC layer may send a connection request to the network for the service sought by the NAS if that service is one of the one or more services allowed.

19 Claims, 7 Drawing Sheets

Related U.S. Application Data

(60) Provisional application No. 61/897,810, filed on Oct. 30, 2013.

(51) Int. Cl.
| | | |
|---|---|---|
| *H04W 48/08* | (2009.01) | |
| *H04W 76/10* | (2018.01) | |
| *H04W 28/12* | (2009.01) | |
| *H04W 4/14* | (2009.01) | |
| *H04W 76/16* | (2018.01) | |
| *H04W 48/16* | (2009.01) | |

(52) U.S. Cl.
CPC ........... *H04W 28/12* (2013.01); *H04W 48/08* (2013.01); *H04W 76/10* (2018.02); *H04W 48/16* (2013.01); *H04W 76/16* (2018.02)

(58) Field of Classification Search
USPC ....................................................... 455/453
See application file for complete search history.

(56) References Cited

U.S. PATENT DOCUMENTS

| | | | | |
|---|---|---|---|---|
| 8,335,199 | B2* | 12/2012 | Mukherjee ............ | H04W 48/02 370/338 |
| 8,995,467 | B2 | 3/2015 | Diachina et al. | |
| 2006/0023664 | A1 | 2/2006 | Jeong et al. | |
| 2008/0031212 | A1* | 2/2008 | Ogura .................. | H04W 28/16 370/338 |
| 2008/0130554 | A1 | 6/2008 | Gisby et al. | |
| 2009/0239554 | A1 | 9/2009 | Sammour et al. | |
| 2010/0182971 | A1* | 7/2010 | Chin ..................... | H04W 76/16 370/329 |
| 2010/0240338 | A1 | 9/2010 | Mallick et al. | |
| 2011/0158165 | A1 | 6/2011 | Dwyer et al. | |
| 2012/0039171 | A1 | 2/2012 | Yamada et al. | |
| 2012/0113895 | A1* | 5/2012 | Diachina ............ | H04L 47/2466 370/328 |
| 2012/0155257 | A1 | 6/2012 | Tiwari | |
| 2012/0244828 | A1* | 9/2012 | Tiwari .................. | H04W 76/50 455/404.1 |
| 2012/0269099 | A1* | 10/2012 | Chin ................... | H04L 65/1016 370/259 |
| 2012/0324100 | A1* | 12/2012 | Tomici .................. | H04L 45/123 709/224 |
| 2013/0040597 | A1 | 2/2013 | Jang et al. | |
| 2013/0044702 | A1 | 2/2013 | Jayaraman et al. | |
| 2013/0045706 | A1 | 2/2013 | Hsu | |
| 2013/0201870 | A1 | 8/2013 | Gupta | |
| 2013/0294396 | A1* | 11/2013 | Iwamura ............... | H04W 72/04 370/329 |
| 2014/0171061 | A1 | 6/2014 | Larmo et al. | |
| 2014/0187252 | A1* | 7/2014 | Gupta .................. | H04W 48/18 455/450 |
| 2014/0198637 | A1 | 7/2014 | Shan et al. | |
| 2014/0233452 | A1 | 8/2014 | Kim et al. | |
| 2015/0036489 | A1 | 2/2015 | Rajadurai et al. | |
| 2015/0065133 | A1* | 3/2015 | Cui ....................... | H04W 36/30 455/436 |
| 2015/0071159 | A1 | 3/2015 | Chun et al. | |
| 2015/0079938 | A1 | 3/2015 | Jung et al. | |
| 2015/0085658 | A1 | 3/2015 | Hong et al. | |
| 2015/0111556 | A1* | 4/2015 | Hapsari .................. | H04W 8/22 455/418 |
| 2015/0257161 | A1 | 9/2015 | Hsu et al. | |
| 2016/0088547 | A1 | 3/2016 | Zhang | |
| 2016/0234715 | A1* | 8/2016 | Futaki .................. | H04W 48/06 |

FOREIGN PATENT DOCUMENTS

| | | |
|---|---|---|
| KR | 20130080836 A | 7/2013 |
| WO | WO 2011/156264 A2 | 12/2011 |
| WO | WO 2013/112410 A1 | 8/2013 |

OTHER PUBLICATIONS

3rd Generation Partnership Project (3GPP), RP-131397, "New Study Item Description: Smart Congestion Mitigation in E-UTRAN", LG Electronics Inc., 3GPP TSG-RAN Meeting #61, Porto, Portugal, Sep. 3-6, 2013, 7 pages.
3rd Generation Partnership Project (3GPP), TS 22.011 V12.0.0, "Technical Specification Group Services and System Aspects, Service Accessibility (Release 12)", Mar. 2013, pp. 1-26.
3rd Generation Partnership Project (3GPP), TS 24.301 V12.2.0, "Technical Specification Group Core Network and Terminals, Non-Access-Stratum (NAS) Protocol for Evolved Packet System (EPS), Stage 3 (Release 12)", Sep. 2013, pp. 1-352.

\* cited by examiner

SYSTEM AND METHODS FOR HANDLING PRIORITY SERVICES CONGESTION

CROSS-REFERENCE TO RELATED APPLICATIONS

This application is a continuation of U.S. Non-Provisional application Ser. No. 15/033,620, filed Apr. 29, 2016, titled "SYSTEM AND METHODS FOR HANDLING PRIORITY SERVICES CONGESTION", which is the National Stage entry under 35 U.S.C. § 371 of Patent Cooperation Treaty Application PCT/US2014/063261, titled "SYSTEM AND METHODS FOR HANDLING PRIORITY SERVICES CONGESTION", filed Oct. 30, 2014, which claims the benefit of U.S. Provisional Application No. 61/897,810, titled "SYSTEM AND METHODS FOR HANDLING PRIORITY SERVICES CONGESTION", filed Oct. 30, 2013, the contents of all of which are incorporated by reference as if fully set-forth herein in their respective entirety, for all purposes.

BACKGROUND

3GPP based networks, among other communication networks, may experience congestion, including congestion corresponding to the communication traffic associated with services and/or procedures. The large number of network devices (e.g., cellular smart phones operated in ever more dense networks) and the corresponding network traffic they generate may also contribute to communication network congestion. For example, video streaming, small data transmissions, voice transmissions, and/or multimedia transmissions, and/or the like, and the network services that support such transmissions may all contribute to network congestion. Important transmissions (e.g., emergency transmissions) could be negatively impacted by what may be stiff competition for transmission resources and/or services in congested networks.

SUMMARY

The Summary is provided to introduce a selection of concepts in a simplified form that are further described below in the Detailed Description. This Summary is not intended to identify key features and/or essential features of the claimed subject matter, nor is it intended to be used to limit the scope of the claimed subject matter.

Systems, methods, and instrumentalities are provided to describe congestion management in a network. A wireless transmit receive unit (WTRU) may set a unique establishment cause or a unique service indication to differentiate a service. The service may be one of: a mobile originated (MO) voice communication, a MO circuit switched fallback (CSFB) voice, CSFB supplementary service (SS), or a MO short message service (SMS). The WTRU may send a service request message comprising a request for connection of the service to a base station. The WTRU may receive a response message in response to the service request. The response message indicates acceptance or rejection of the request for the connection of the service.

Embodiments contemplate one or more techniques for a wireless transmit/receive unit (WTRU) that may be in communication with a communication network and/or may include a Radio Resource Control (RRC) layer. The RRC layer may receive a first message, where the first message may include an indication for a service. The RRC layer may receive a second message, where the second message may indicate one or more services allowable by the communication network. The service may be determined to be one of the one or more services allowable by the communication network. The RRC layer may send a connection request for the service upon the service being one of the one or more services allowable by the communication network.

Embodiments contemplate one or more techniques for a wireless transmit/receive unit (WTRU) that may be in communication with a communication network and/or may include a Radio Resource Control (RRC) layer. The RRC layer may receive a first message, where the first message may include an indication for a service. The RRC layer may receive a second message, where the second message may indicate one or more services allowable by the communication network. The service may be determined to not be one of the one or more services allowable by the communication network. The RRC layer may refrain from sending a connection request for the service upon the service not being one of the one or more services allowable by the communication network.

BRIEF DESCRIPTION OF THE DRAWINGS

The following detailed description of example embodiments is provided with reference to the appended drawings. For the purposes of illustration, the drawings show example embodiments. The contemplated subject matter is not limited to the specific elements and/or instrumentalities described or illustrated. And absent specific notation to the contrary, no subject matter is contemplated as necessary and/or essential. In addition, the described embodiments may be employed in any combination, in whole or in part. In the drawings.

DETAILED DESCRIPTION

A detailed description of example embodiments will now be described with reference to the various Figures. Although this description provides a detailed example of possible implementations, it should be noted that the details are intended to be examples and in no way limit the scope of the application. As used herein, the article "a" or "an", absent further qualification or characterization, may be understood to mean "one or more" or "at least one", for example. Also, as used herein, the phrase user equipment (UE) may be understood to mean the same thing as the phrase wireless transmit/receive unit (WTRU).

Figure 1A:
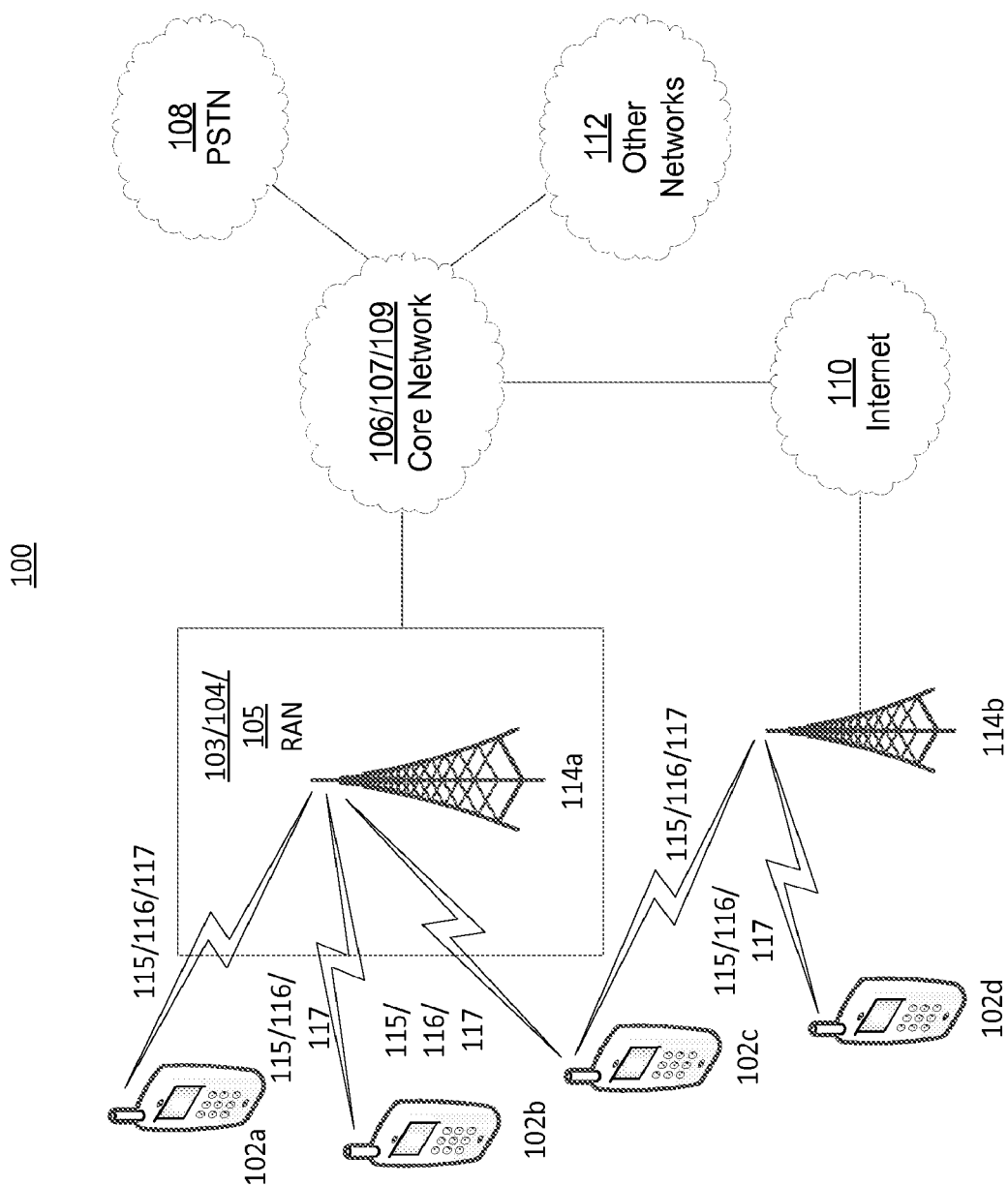
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
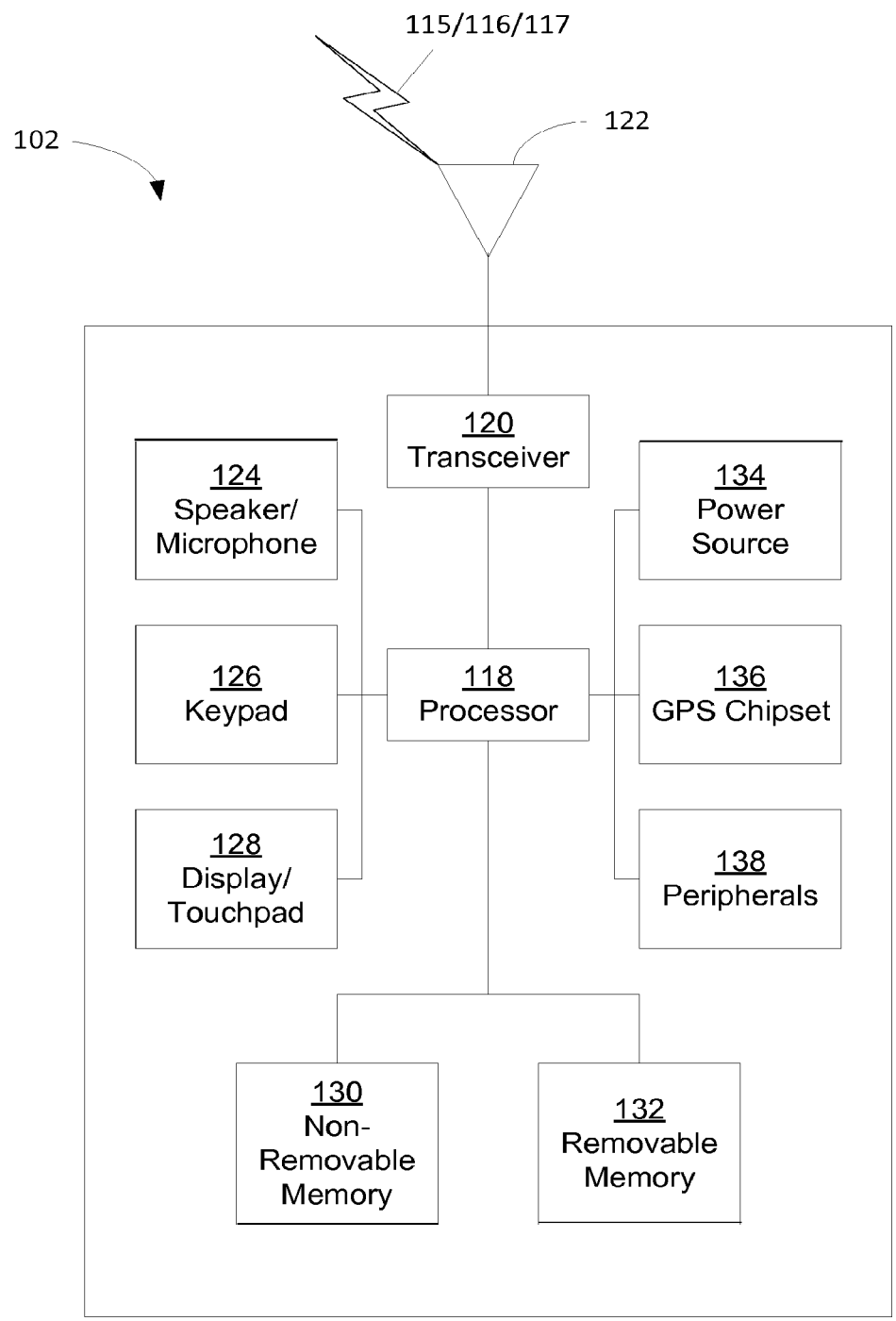
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth, module, a frequency modulated (FM) radio unit, a digital music player, a media player, a video game player module, an Internet browser, and the like.

Figure 1C:
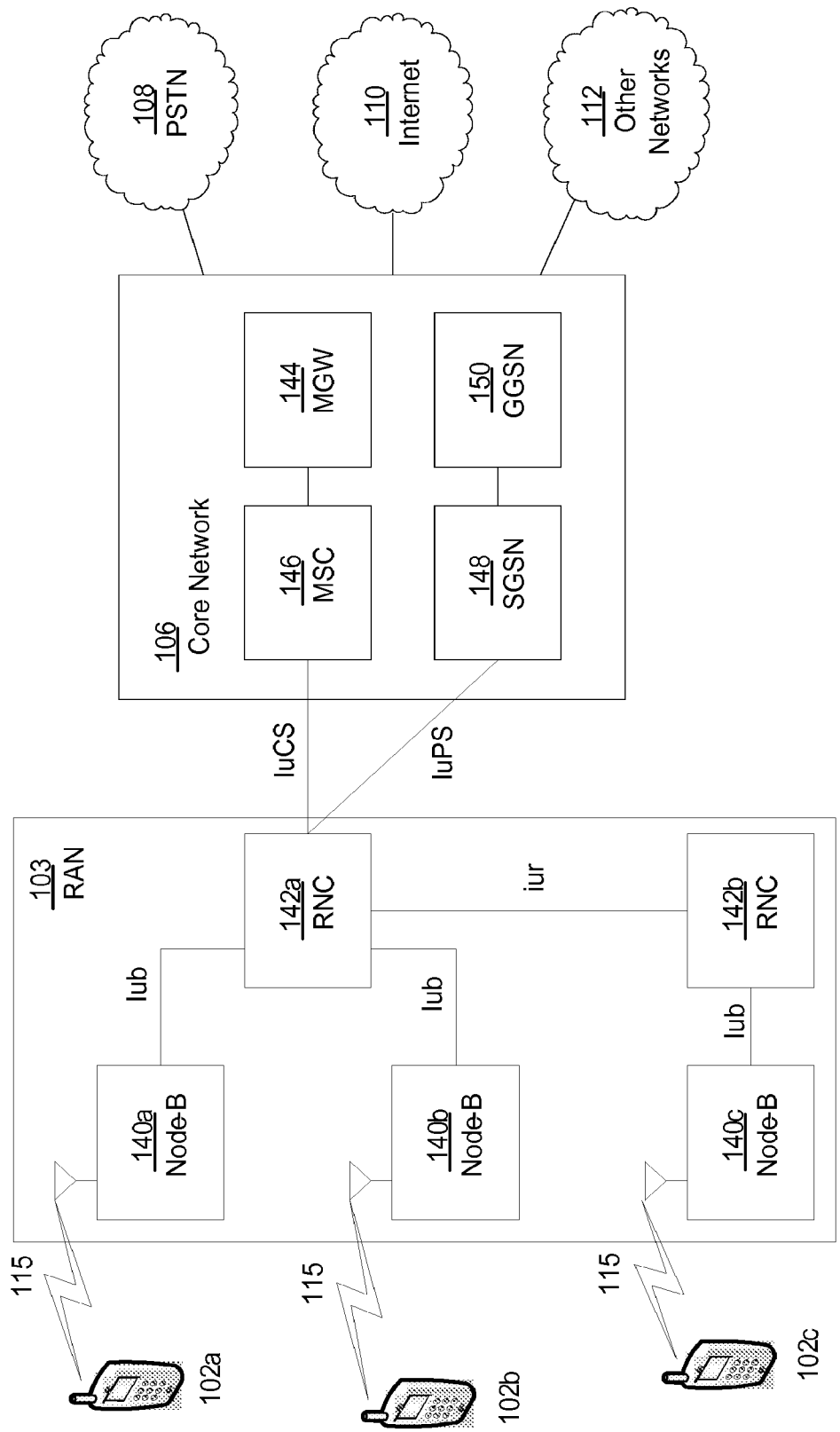
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106 may also be connected to the networks 112, which may include other wired or wireless networks that are owned and/or operated by other service providers.

Figure 1D:
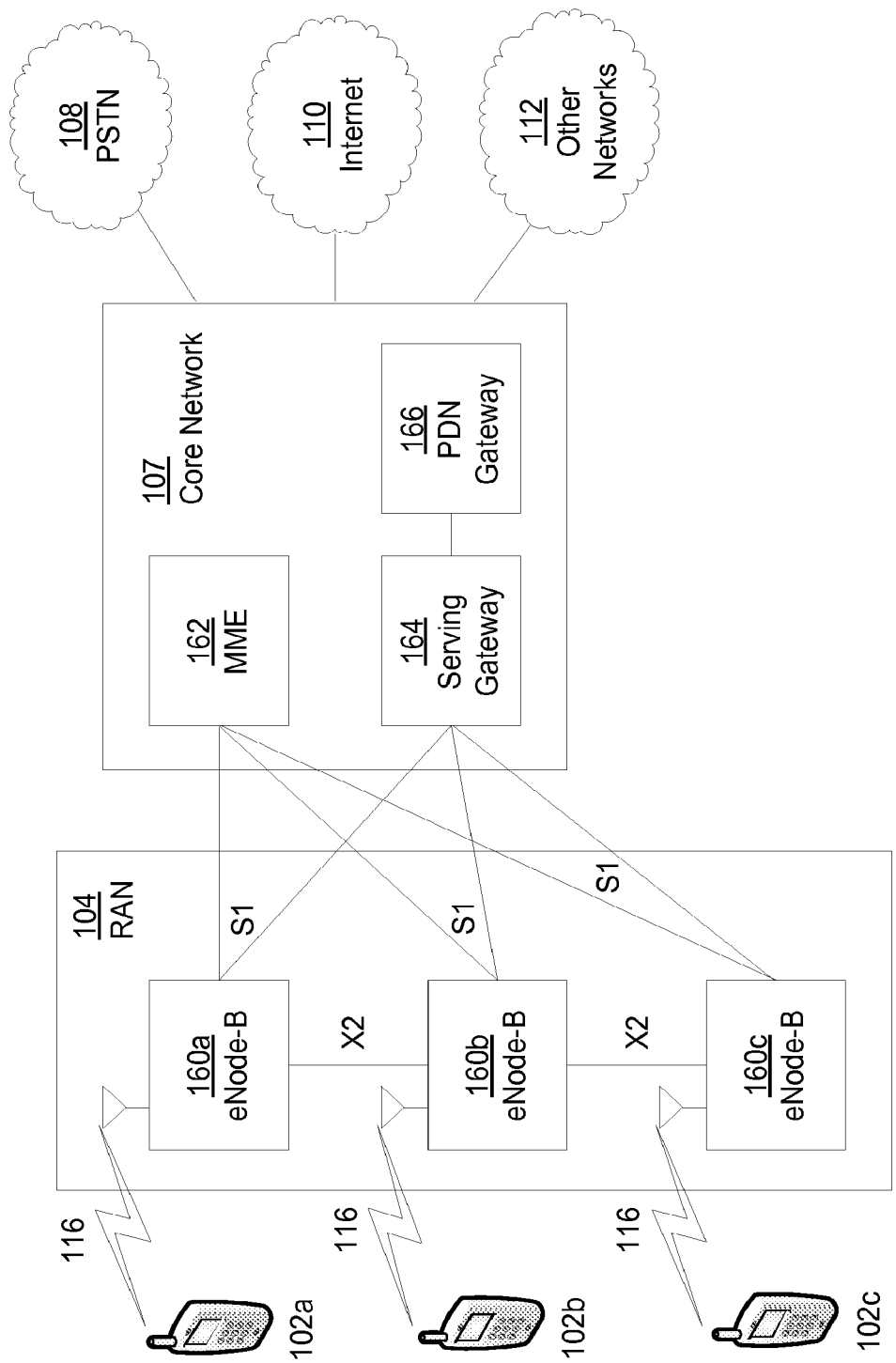
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
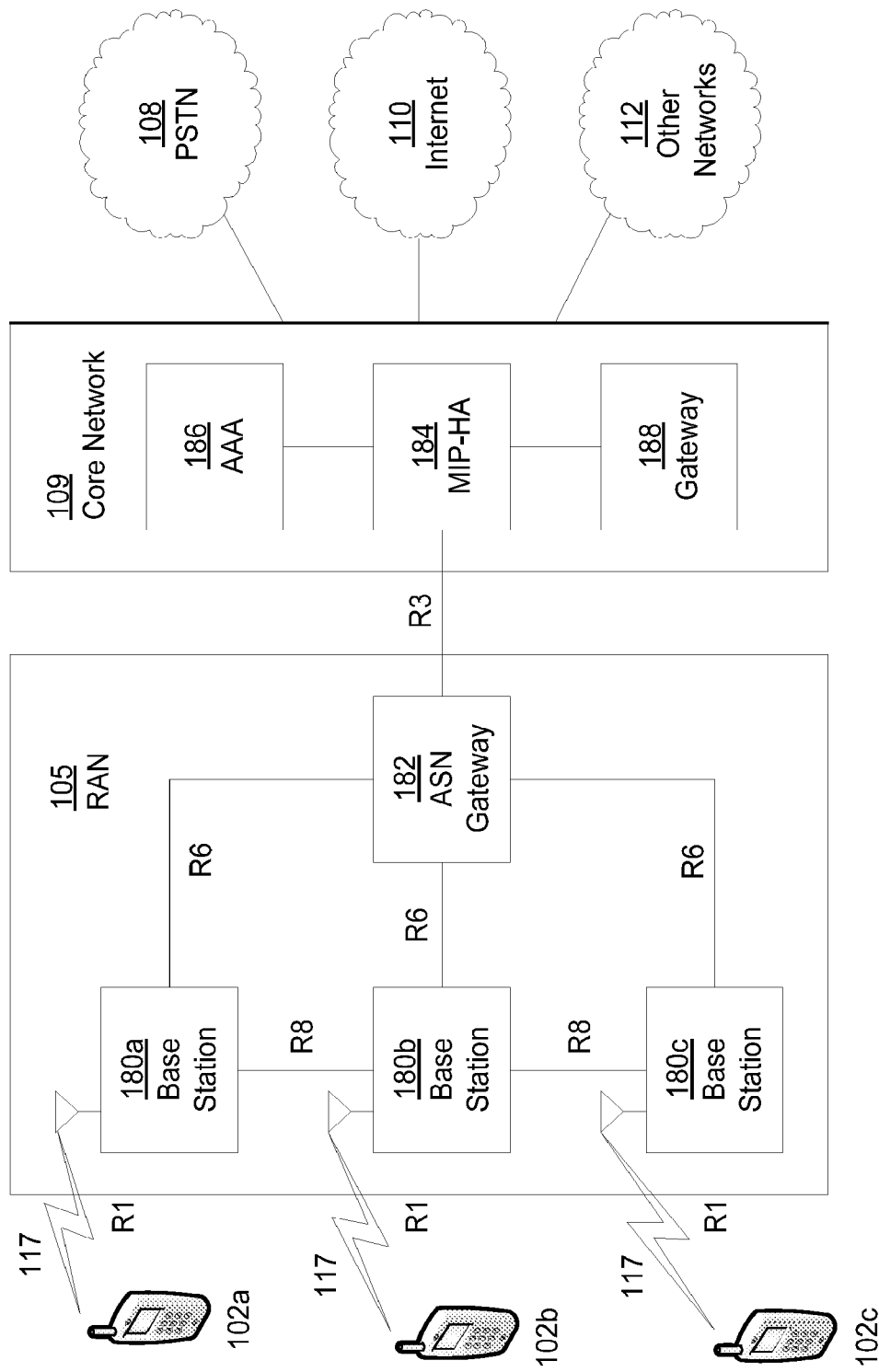
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile TP home agent (MTP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

In a 3GPP based networks, for example, congestion mitigation and/or prioritization of services may be provided. In some cases, some services/procedures may have lower priority or might not be allowed at all, while other services may be given higher priority. An evolved Node B (eNB), however, might not be able to distinguish radio resource control (RRC) connection requests including requests for the services that may have lower priority (or perhaps not allowed at all) from the ones that may have higher priority. Embodiments contemplate that it may be useful to differentiate the radio resource control (RRC) connection requests of various types of services at the eNB.

Considerations for congestion mitigation and/or prioritization of certain services in mobile networks (e.g., 3GPP based mobile networks) may be provided. In some cases, one or more services and/or procedures might not be allowed in the system (e.g., mobile originated signaling for user data) or may be given a lower priority, while other services may be given a higher priority (e.g., emergency services over packet switched (PS) or circuit switched (CS) domains). One or more barring mechanisms may be provided such as access class barring (ACB), service specific access barring (SSAB) (e.g., to implement reduction in circuit switched fallback (CSFB) request), and/or extended access barring (EAB) (e.g., to reduce the number of access attempts made by devices that are considered to be low access priority devices (LAPD)).

Congestion and/or prioritization of use of one or more services may be provided. For example, a MO voice communication request, IMS voice or CSFB requests, or the like, may be prioritized over other IP data (e.g., video stream and/or browsing data). Congestion mitigation handling mechanisms in RRC_IDLE and RRC_CONNECTED may be improved, for example to provide prioritization of the mobile originating accesses during congestion (e.g., emergency access, high priority access, etc.). Prioritization of mobile originating access (e.g., access for initiation of voice services such as MO voice communication, MMTEL voice calls, and/or CSFB voice calls) may be provided during congestion, for example perhaps based on an operator's policy and/or other scenario.

A wireless transmit receive unit (WTRU) in an LTE network may have access to CS service such as SMS, and/or CS voice calls and/or supplementary services (SS). The SMS service may be natively provided using NAS signaling. For example, SMS messages may be sent via LTE NAS messages that may act as a transport for the message. The CS voice calls may be made available via CSFB, for example in which a WTRU may request to perform an intersystem change (e.g., using the NAS Extended Service Request (ESR) message). In some embodiments, the CS voice call may be placed in GERAN/UTRAN, perhaps for example after the intersystem change. The WTRU might not receive a service, e.g., perhaps for example when the WTRU is in idle mode and/or when the WTRU is not in a connected mode. The WTRU may establish an RRC connection for which an establishment cause may be passed to the eNB, for example so that the eNB may know the reason for the connection request and/or act upon it (e.g., accept or reject the request). The establishment cause that the WTRU may use may correspond to the procedure that the WTRU may be requesting (e.g., the indicated service). The NAS layer may verify the establishment cause (or the indicated service) and/or corresponding procedure. The NAS layer may pass the establishment cause or a service indication to the RRC layer. Table 1 illustrates the establishment causes that may be used, for example when the Service Request/Service Indication is initiated. The WTRU may transition to connected mode, for example at service request initiation, perhaps in order to send an SMS, request a CSFB, and/or request use of resources for IP data, etc.

TABLE 1

| NAS procedure | RRC establishment cause | Call type |
|---|---|---|
| Service Request/ Service Indication | If a SERVICE REQUEST is to request user plane radio resources, the RRC establishment cause may be set to MO data. | "originating calls" |
| | If a SERVICE REQUEST is to request user plane radio resources for emergency bearer services, the RRC establishment cause may be set to Emergency call. | "emergency calls" |
| | If a SERVICE REQUEST is to request resources for UL signalling, the RRC establishment cause may be set to MO data. | "originating calls" |
| | If a SERVICE REQUEST is triggered by a PDN CONNECTIVITY REQUEST that has request type set to "emergency", the RRC establishment cause may be set to Emergency call. | "emergency calls" |
| | If a SERVICE REQUEST is a response to paging where the CN domain indicator is set to "PS", the RRC establishment cause may be set to MT access. | "terminating calls" |
| | If an EXTENDED SERVICE REQUEST has service type set to "packet services via S1" and is to request user plane radio resources for emergency bearer services, the RRC establishment cause may be set to Emergency call. | "emergency calls" |
| | If an EXTENDED SERVICE REQUEST has service type set to "packet services via S1" and is triggered by a PDN CONNECTIVITY REQUEST that has request type set to "emergency", the RRC establishment cause may be set to Emergency call. | "emergency calls" |
| | If an EXTENDED SERVICE REQUEST has service type set to "packet services via S1" and is a response to paging where the CN domain indicator is set to "PS", the RRC establishment cause may be set to MT access. | "terminating calls" |
| | If an EXTENDED SERVICE REQUEST has service type set to "mobile originating CS fallback or 1xCS fallback" and is to request mobile originating 1xCS fallback, the RRC establishment cause may be set to MO data. | "originating calls" |
| | If an EXTENDED SERVICE REQUEST has service type set to "mobile originating CS fallback or 1xCS fallback" and is to request mobile originating CS fallback, the RRC establishment cause may be set to MO data. | "mobile originating CS fallback" |
| | If an EXTENDED SERVICE REQUEST is a response to paging for CS fallback, service type set to "mobile terminating CS fallback or 1xCS fallback", the RRC establishment cause may be set to MT access. | "terminating calls" |
| | If an EXTENDED SERVICE REQUEST has service type set to "mobile originating CS fallback emergency call or 1xCS fallback emergency call", the RRC establishment cause may be set to Emergency call. | "emergency calls" |
| | If an EXTENDED SERVICE REQUEST contains the Device properties IE with low priority indicator set to "MS is configured for NAS signalling low priority", the RRC establishment cause may be set to Delay tolerant. | "originating calls" |

Some embodiments recognize that an eNB might not differentiate between requests for SMS from a WTRU and IP Data. As illustrated in Table 1, for example, the WTRU (e.g., NAS) may set the service indication or establishment cause to MO data, perhaps for example if the service request procedure may be initiated for CSFB, SMS transmission, and/or user plane resources. Some embodiments recognize that the eNB might not differentiate between the RRC connection requests and might not be able to apply the appropriate barring and/or prioritization mechanism(s). To enhance the system performance, reduce congestion, and/or to prioritize one or more services (e.g., MO voice communication), embodiments contemplate that it may be useful to differentiate requests at the eNB so that the request may be treated, perhaps for example, based on a congestion level on the system and/or the eNB, among other scenarios. For example, the eNB may be configured to allow MO voice calls, whereas SMS might be not allowed (or may be provided a lower relative priority than the MO voice calls) in times of (e.g., relatively high) congestion, (e.g., perhaps because the SMS is a non-real time service, among other reasons).

One or more barring mechanisms may be provided that may limit one or more WTRUs, e.g., with certain configurations, to access the system, perhaps for certain services (for example as described herein). Embodiments contemplate that it may be useful to optimize the barring mechanisms. For example, CSFB may be used for voice calls and supplementary service (SS). The voice calls may be more important than SSs. From the WTRU's and/or the network's (e.g., the eNB's) perspective, the actual reason (e.g., the voice call or the SS) for performing CSFB may be transparent. Embodiments recognize that the defined access class barring (ACB) mechanism might not differentiate between barring for CSFB due to voice call or due to SS. For the WTRUs that are in idle mode, embodiments recognize that the access control mechanisms might not differentiate between the voice or video (e.g., IP multimedia system (IMS) voice or video) access from other data. The voice might not be prioritized, e.g., when going from an RRC idle state to an RRC connected state.

A network may use service specific access control (SSAC) to suppress and/or down prioritize mobile originated (MO) accesses for MMTEL-voice and MMTEL-video in RRC Connection Establishment. The network might not use SSAC to disallow other MO accesses in congestion while allowing MO accesses for MMTEL-voice and MMTEL-video. The voice over LTE (VoLTE) calls may suffer from a double barring. For example, the VoLTE calls may be barred by SSAC and may again be barred by the regular ACB. Even if a WTRU requesting a VoLTE passes the SSAC test in the IMS level, it may be subject to the legacy ACB test in the RRC, which it might not pass. The access of normal data might not be controlled with ACB, e.g., without impacting voice calls. Such access barring mechanism may be in conflict with the mechanism where VoLTE traffic may have higher priority than, for example, background traffic. The inability to differentiate between requests for SMS and IP data and the insufficient barring mechanisms may result in increase in the number of attempts for RRC connection establishment. The increase in the number of attempts for RRC connection establishment may degrade the system, perhaps for example but not limited to cases of congestion during which a fewer number of services may be allowed by the network.

Quality of Service (QOS) class identifier (QCI) based access barring may be provided. Access control may be applied and/or performed on one or more QoS mechanisms, e.g., QCI. A WTRU may be aware of the QCI for one or more, or each, of the bearers the WTRU may have. The eNB may signal the QCI bearer that may be useful to be prioritize, perhaps while other bearers may be backed off or assigned a lower priority. Such prioritization of QCI bearers may cause the WTRU to send packets on a specific bearer which may have been prioritized while backing off system access requests for the data on the other bearers. Embodiments contemplate one or more techniques for the network and/or the eNB to indicate that there is congestion in the network and/or if perhaps voice or a certain QCI may be prioritized.

Embodiments recognize that the WTRU may have multiple access barring mechanisms at different layers, for example the AS, NAS, and IMS application. Embodiments contemplate one or more techniques such that these mechanisms may work in parallel with the QCI access barring mechanism, for example without causing any conflict.

Embodiments recognize that it may be useful for the WTRU to prioritize its bearers carrying voice packets over other bearers in certain scenarios, for example in some emergencies, perhaps instead of the eNB initiating the QCI based access barring. Embodiments contemplate one or more techniques for the WTRU to request such QCI level prioritization and/or how the network/eNB may process such requests from the WTRU.

Establishment cause(s) and/or service indication(s) per service type(s) may be provided. Establishment causes (or service indications) may differentiate the mobile originated (MO) requests for SMS, MO voice communication, CSFB for voice call, and/or CSFB for SS. Such establishment causes or service indications may apply to GERAN/UTRAN. For example, in UTRAN the WTRU may use a unique establishment cause or service indication for voice calls, SMS, and/or SS. A WTRU (e.g., NAS) may set the service indication or establishment cause to MO voice communication and/or MO CSFB voice, perhaps for example when initiating the service request procedure for MO voice communication and/or MO CSFB for voice call. The WTRU (e.g., NAS) may set the service indication or establishment cause to CSFB SS, perhaps for example when initiating the service request procedure for CSFB for SS. The WTRU (e.g., NAS) may set the service indication or establishment cause to MO SMS (or MT SMS for mobile terminated SMS), perhaps for example when initiating the service request procedure for MO SMS (or for MT SMS). The WTRU RRC layer may send a request for the service indicated to the network/eNB. In some embodiments, the RRC request may include the service indication, perhaps as part of an establishment cause for the service.

An eNB may be configured to filter an RRC request (e.g., to reject certain requests), perhaps for example based on the service requested. The eNB for example may reject requests for SMS. The eNB may reject a request for an RRC connection, e.g., perhaps if the establishment cause is set to MO SMS, and/or if the eNB is configured to reject requests for SMS service.

The eNB may have configurations (e.g., provided via operations and maintenance (O&M)) such that the configurations may be used to accept or reject a request. The MME may inform the eNB to reject connections for certain specific services such as MO SMS, MO voice communication, CSFB SS, etc. The MME may do so using an S1AP procedure that may be defined and the MME may indicate that the service be de-prioritized. This may be done using a bitmap where a bit position may refer to a certain service (e.g., provided/facilitated by the eNB/communication network for the WTRU). The eNB may reject RRC connections, or release existing connections that may be affected based on the information received, e.g., either from MME or via configurations. S1AP procedures (e.g., S1 AP overload start) may be utilized. An MME may use a mechanism to inform the eNBs to stop access restriction (e.g., accept requests) for services as described herein.

The eNB may reject the WTRU's MSG1 or MSG3, for example during the Radom Access Channel (RACH) procedure. The eNB may include a cause code to indicate that the reason for rejection may be a service (e.g., MO SMS). The WTRU may learn that the requested service (e.g., as indicated in the corresponding establishment cause) might not be allowed, e.g., upon a rejection of a connection by the eNB, and/or upon release of an RRC connection. The eNB might include a timer that the WTRU may use to back-off or refrain from sending requests for this service (e.g. implement barring and/or ACB for this service), perhaps for example until the timer expires and/or until an indication may received by the WTRU, e.g., via a System Information Block (SIB). The SIB may indicate that a service may be again permitted. The eNB may carry on with the request and/or forward the establishment cause to the MME. The MME may decide to reject the connection based on the service indicated or the type of service indicated. The connection rejection may be implemented at the MME. The MME may reject the NAS connection (e.g. with a Service Reject) and may indicate the cause to the WTRU. The MME may indicate the cause with a back-off timer. The back-off timer may prohibit the WTRU from sending other requests for the rejected service until the timer is expired and/or the WTRU is paged for a similar MT service. In some embodiments, the WTRU may monitor an internal timer for the back-off time or refraining time (e.g., barring time) for sending requests for the indicated service. The WTRU timer may be activated/started upon a rejection of a connection by the eNB, upon release of an RRC connection, and/or a receipt of another signal indicating that the one or more services are not permitted. The WTRU timer preset value may be statically configured and/or dynamically adjustable (e.g., as part of a signal indicating that one or more services.

Figure 2:
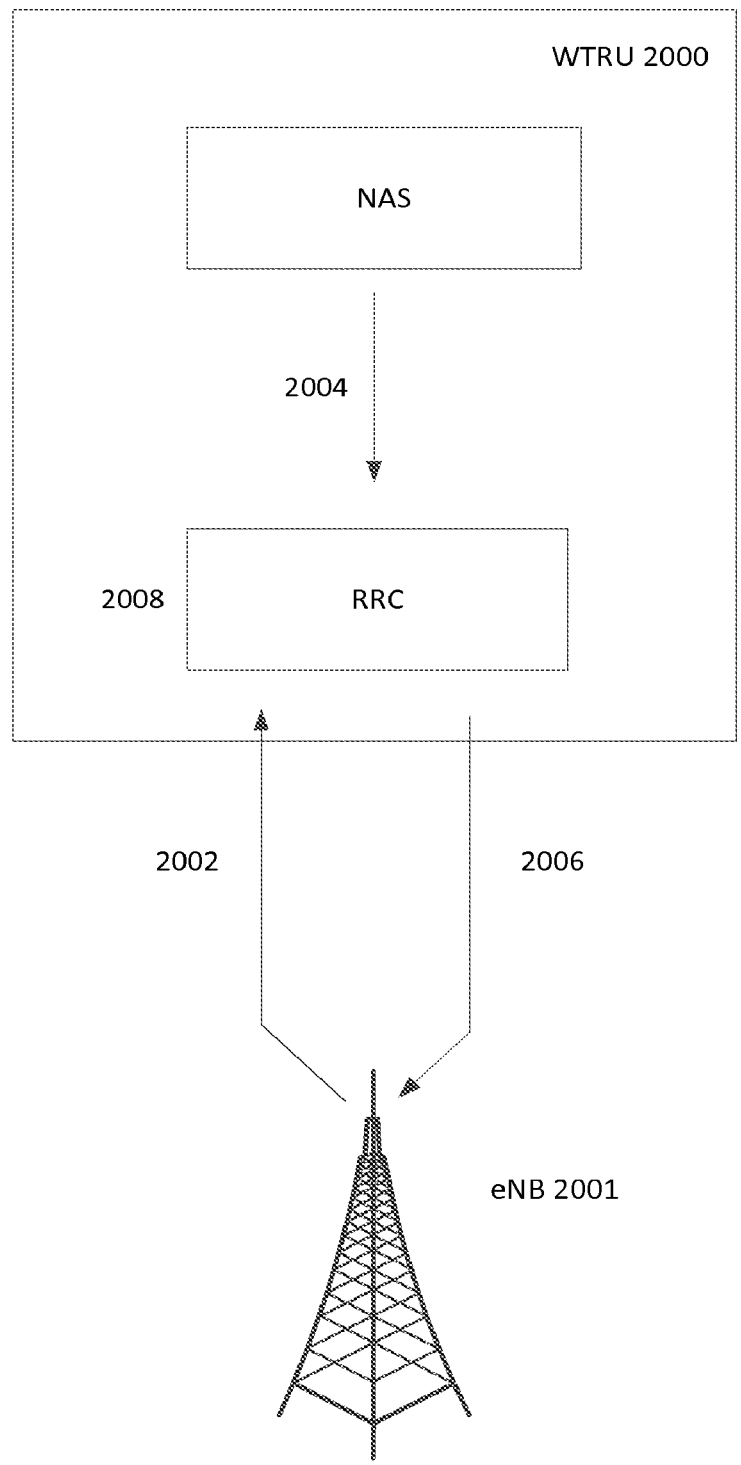
FIG. 2 is a diagram of an example of a service prioritization/barring technique, consistent with embodiments.

Referring to FIG. 2, at 2002, a WTRU 2000 may receive an SIB from eNB 2001 that may indicate one or more services is/are allowed and/or one or more services is/are not allowed, for example MO SMS, and/or voice, etc. At 2004, for example, the NAS may send a message to the RRC, where the message may include a service request, perhaps with a service notification or an establishment cause (e.g., contains a fresh call/service type such as a MO SMS, and/or a MO voice call, or the like). At 2006, the WTRU 2000 may send an RRC connection request to establish RRC connection(s) for the corresponding services, perhaps for example based on the information received in the SIB and/or service request. For example, a bit position for MO SMS may be set to a value (e.g., in a bit map) indicating that MO SMS is allowable (e.g., not barred) by the eNB 2001 (and/or the communication network of which eNB 2001 is a part). The WTRU 2000, perhaps for example after reading the SIB and/or bit position, may send a RRC connection request(s) for MO SMS (e.g., to the eNB/network). Alternatively or additionally, at 2008, the WTRU 2000 may refrain from sending an RRC connection request to establish a RRC connection(s) for the corresponding services, perhaps for example based on the information received in the SIB and/or service request. For example, a bit position for MO SMS may be set to a value (e.g., in a bit map) indicating that MO SMS is not allowable (e.g. barred) by the eNB 2001 (and/or the communication network of which eNB 2001 is a part). The WTRU 2000, perhaps for example after reading the SIB and/or bit position, may refrain from sending a RRC connection request(s) for MO SMS (e.g., to the eNB/network). The refraining may include barring the MO SMS service, which may include implementing ACB for MO SMS, for example.

Finer (e.g., more granular) barring per service may be provided. Embodiments contemplate finer granularity of barring per specific service (e.g., a barring mechanism may be implemented for MO voice communication, MO CSFB for voice, CSFB SS, and/or MO SMS). A bitmap (or other indications) may be included in the system information block (SIB) to indicate the service may be allowed (e.g., not barred) and/or might not be allowed (e.g., barred).

For example, the eNB (perhaps, for example, using configurations or indications from the MME as described herein) may set a bit position to 1 for the corresponding service (e.g., a bit position may be known to represent or correspond to a certain service). A bit position of 1 for a corresponding service may indicate that the service is allowed (e.g., not barred) by the eNB/communication network. The WTRU may read this information from the SIB(s), and the WTRU may establish an RRC connections for the corresponding service(s) (e.g., as requested by another layer—such as the NAS layer). For example, during (e.g., relatively low) congestion, the bit position for SMS may be set to 1 and the WTRU, after reading the SIB and/or the bit position, may send a RRC connection requests for SMSs. Embodiments contemplate that a bit value of 1 or 0 may be used to convey allowable (e.g., not barred) services or not allowed (e.g. barred) services, perhaps as most suitably configured per operator/user devices.

Also by way of example, a bit position of 0 for a corresponding service may indicate that the service is not allowed (e.g., barred) by the eNB/communication network. The WTRU may read this information from the SIB(s), and the WTRU may refrain from establishing an RRC connections for the corresponding service(s). For example, during (e.g., relatively high) congestion, the bit position for SMS may be set to 0 and the WTRU, after reading the SIB and/or the bit position, may refrain from sending RRC connection requests for SMS. Refraining may include barring SMS, which may include applying ACB for SMS. The RRC layer may inform the NAS layer about the barring. The RRC layer may inform the NAS layer when/if the barring ends. The NAS layer (e.g., evolved mobility management (EMM)) may inform the entity that may trigger the request (e.g., the SMS entity) that the service may be unavailable, perhaps for some time. The WTRU may display a corresponding message to the user.

Figure 3:
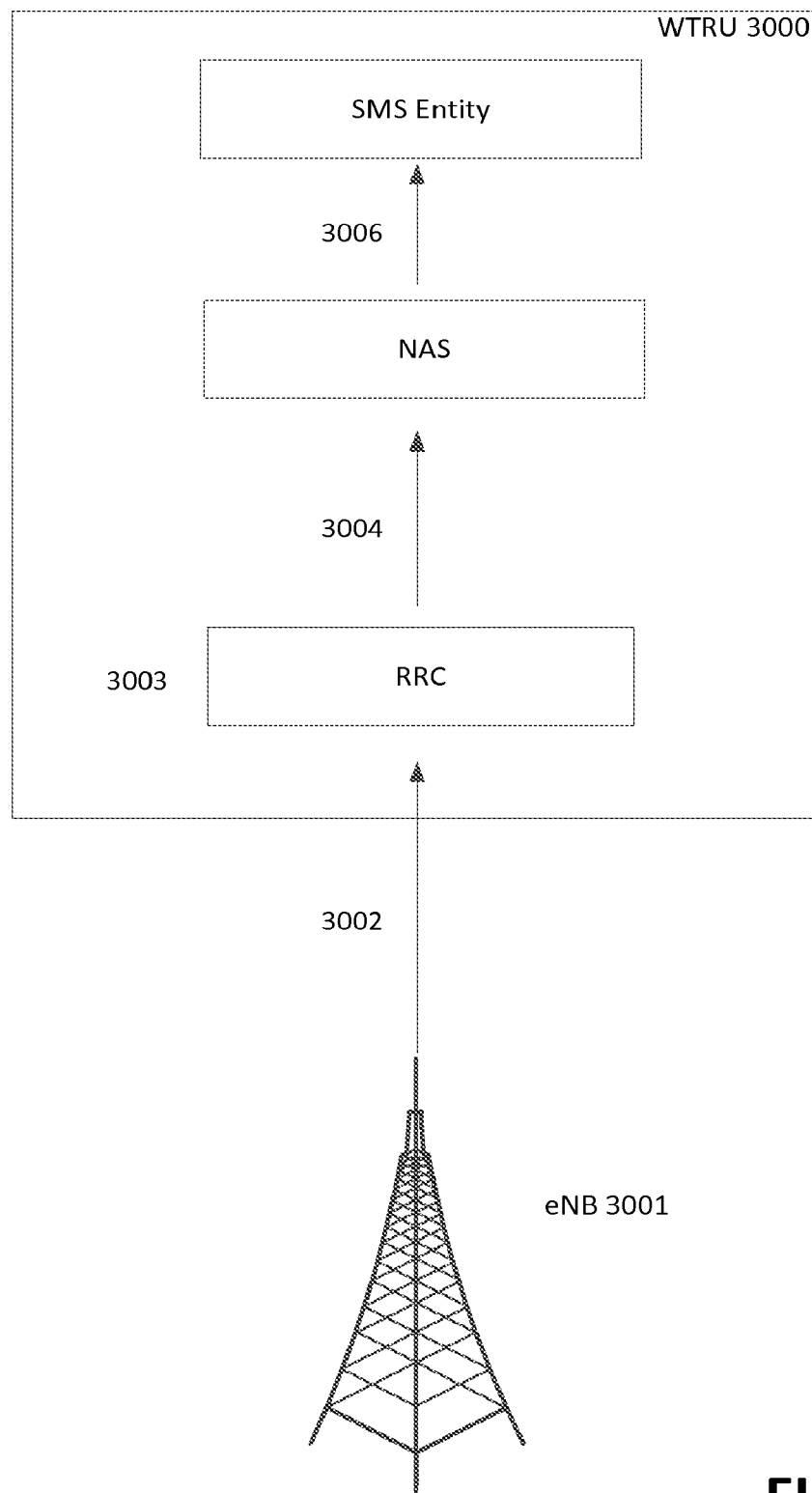
FIG. 3 is a diagram of an example of a service prioritization/barring technique, consistent with embodiments.

Referring to FIG. 3, at 3002 a WTRU 3000 may receive a SIB from eNB 3001 that may indicate that one or more services is/are allowed and/or one or more services is/are not allowed, for example a MO SMS and/or voice, etc. At 3003, the WTRU 3000 may refrain from sending an RRC connection request to establish a RRC connection(s) for the one or more services indicated as not allowed, perhaps for example based on the information received in the SIB and/or service request. For example, a bit position for MO SMS may be set to a value (e.g., in a bit map) indicating that MO SMS is not allowable (e.g. barred) by the eNB 3001 (and/or the communication network of which eNB 3001 is a part). At 3004, the RRC layer may inform the NAS layer of a service specific ACB. The RRC layer may inform the NAS layer when the barring ends and/or is to end. At 3006, the NAS layer (e.g., an EMM) may inform the entity that triggered the request (e.g. a SMS entity) that the service is unavailable (e.g., for some time).

The network (e.g., eNB and/or MME) may inform the WTRUs that MO requests for SMS might not be permitted for a certain duration (e.g., as configured by the network), perhaps for example to increase the chances of successful RRC connections for voice calls, reduce congestion, and/or prioritize certain services such as voice calls (e.g., MO voice, voice communication, IMS and/or CSFB for voice, or CSFB). Such permission information may reduce RRC connection requests that may otherwise have been initiated for SMS, which may for example increase the chances of success for other services (e.g. voice calls that may be of higher priority).

One or more priority levels may be provided. For example, the MT IMS and/or the MO voice communication (and/or CSFB voice) may be given a highest priority (e.g., priority level 1). The MO voice communication, and/or the MO IMS and/or the CSFB voice may be given a lower priority than priority level 1 (e.g., priority level 2). The MT SMS may be given a lower priority than priority level 2 (e.g., priority level 3). The MO SMS may be given a lower priority than priority level 3 (e.g., priority level 4). The MT SS may be given a lower priority than priority level 4 (e.g., priority level 5). The MO SS may be given the lowest priority (e.g., priority level 6). The WTRU may be configured with this list of priority levels (or other similar lists). The WTRU may be informed to start congestion control. The WTRU may use the configuration to refrain from requesting certain services, perhaps as informed by the eNB using broadcast signaling, and/or as informed via dedicated signaling from the eNB and/or the mobility management entity (MME). One or more of the contemplated techniques may be employed in GERAN/UTRAN. One or more of the contemplated techniques may be employed by the WTRU in a connected mode. One or more techniques may be employed by a Base Station System (BSS)/RNC for GERAN/UTRAN, respectively. The MME equivalent may be mobile switching center (MSC) or SGSN.

Operator policy based access control may be provided. Operator policy based access control may be realized through the use of operator specific policy and access control rules. The policy may be a flow based policy (e.g., an IP flow based policy), a service based policy (e.g., a specific APN), a signaling radio bearer based policy (e.g., signaling radio traffic filter or identifier), a data radio bearer based policy, and/or a QCI based policy, etc. The IP flow filters may include one or more of an address type, a start source IP address, an end destination IP address, a protocol type, a start source port number, an end source port number, a start destination port number, an end destination port number, an QOS, and/or an application ID. The policy may be preconfigured on the WTRU and/or signaled to the WTRU for example through control plane or through user plane. An example of signaling through control plane may be RRC broadcast signaling, RRC dedicated signaling, and/or NAS signaling, etc. An example of user plane signaling may be signaling over the S14 interface. The ANDSF policy signaling mechanism may be used. Another example of user plane signaling mechanism may be signaling over the IMS signaling data bearer. The policy may be enumerated and/or be represented in the form of a bitmap where one or more, or each, element of the enumeration or the bitmap points to a specific policy definition in the WTRU. For example, different policies could be set for different categories of users (e.g., gold users versus silver users versus bronze users).

The policy based access control may be achieved for example through access barring mechanism and/or access prioritization mechanism. The network (e.g., eNB and/or MME) may signal the policy based access control information to the WTRU to activate specific access barring policy or policies. The network (e.g., eNB and/or MME) may signal the policy based access control information to the WTRU to activate specific access prioritization policy or policies. The enforcement of the policy may be done in the access stratum for, for example like the enforcement of an ACB or an EAB mechanism. The enforcement of the policy may be done in one or more higher layers, for example the non-access stratum layer or IMS level like an SSAC. The enforcement of the policy may be provided in the access stratum layer and/or a higher layer, perhaps for example depending on the type of the traffic being access controlled. The definition of the policy may include a validity area definition. For example, a policy may be activated by the network and/or may apply to a given subscriber if the validity area defined for the policy in the WTRU may include the current location of the subscriber. The policy may include the time of the day for the applicability of the policy. For example, a policy may be activated by the network and/or may apply to a given subscriber if the time of the day defined for the policy in the WTRU may cover the time during which the policy may be active.

A network may configure a WTRU with one or more policies. For example, there may be three policies P1 and P2 and P3 (policy annotation used for purposes of illustration and not limitation). Policy P1 may be set for gold subscribers, policy P2 may be set for silver subscribers, and policy P3 may be set for bronze subscribers. For example, one or more of the policies P1, P2, and/or P3 may include one or more traffic flow filters. Again by way of example, example the policy P1 may include three IP flow filters (e.g., F1(P1), F2 (P1) and F3 (P1)). The policy P2 may include three IP flow filters (e.g., F1(P2), F2(P2), F3(P2)). The policy P3 may include two IP flow filters (e.g., F1(P3), F2(P3)).

An Access Network Discovery and Selection Function (ANDSF) server may configure over the S14 interface, the WTRUs with P1, P2 and/or P3 policy. The eNB may configure the WTRU with the policies P1, P2, and/or P3. The eNB may use dedicated RRC signaling and/or RRC broadcast signaling. The RRC layer of the WTRU may forward the policies to the upper layer within the WTRU, perhaps for example upon receiving the policies P1, P2, and/or P3. The MME may signal the policies P1, P2 and/or P3 to the WTRU. The NAS layer of the WTRU may forward the policies to other entities within the upper layer of the WTRU and/or may forward them down to the access stratum layer within the WTRU, perhaps for example upon receiving the policies P1, P2, and/or P3.

The WTRU may be statically pre-configured by the operator with the policies P1, P2, and/or P3. The preconfigured policies on the WTRU may be updated using one of the methods described herein. The function in the WTRU that may receive the preconfigured policies P1, P2 and/or P3 may forward the policies to the NAS layer, the access stratum layer, and/or the ANDSF client on the WTRU, or other entities in the WTRU that may interact with the access control, e.g., the IMS layer.

The eNB may signal a bitmap, for example, [bit(P1)=1, bit(P2)=0, bit(P3)=0] to the WTRU. The bitmap may be signaled using RRC dedicated signaling and/or RRC broadcast signaling. For example, the eNB may use the bit map to inform the WTRU that traffic matching the criteria of policy P1 (e.g., the IP flows that may be defined in policy P1) may be prioritized for access, perhaps while traffic matching the criteria of policy P2 and/or P3 may be barred from access, or assigned a lower relative priority than that of the P1 traffic. The eNB may control the activation and/or deactivation of access control on the WTRU using an activation flag. The eNB may signal the activation flag to the WTRU(s) using RRC dedicated signaling and/or RRC broadcast signaling. For example, perhaps as an optimization, the eNB may broadcast a priority factor for one or more, or each, of the policy P1, P2 and/or P3, with 0≤priority factor ≤1 for one or more, or each of the policies. The network (e.g., the eNB) may use the priority factor for a given policy to control the one or more WTRUs with a given policy that may be prioritized for access. The eNB may broadcast a barring factor for one or more, or each, of the policy P1, P2 and/or P3, with 0≤barring factor ≤1 for one or more, or each, of the policies. The eNB may use the barring factor to control the one or more WTRUs with a given policy that may be barred for access. The eNB may broadcast a barring time for one or more, or each, of the policy P1, P2 and/or P3. The eNB may use the barring time for a given policy to control how long the access for a WTRU may be barred for traffic matching the criteria defined by that policy.

Other network nodes, e.g., an MME, may signal to the WTRU the policy bitmap, the priority factor, the barring factor, and/or the barring time. The MME may signal this information to the WTRU, for example using the NAS signaling and/or other higher layer protocol signaling. An IMS signaling node may signal the information to the WTRU. A network node such as the ANDSF server may signal the policy information to the WTRU.

While the IP flows may be used to describe the policies P1, P2 and/or P3 (as in the previous example), other parameters for example QCI and/or APN (e.g., service based access control) may be used to define the policies P1, P2 and/or P3. For example, P1 may include one or more Internet Protocol (IP) flows with QCI 1, QCT 5, and/or QCI 9; P2 may include one or more IP flows with QCI 3 and/or QCI 9; P3 may include an IP flow with at least QCI 9, or the like. The eNB may be configured by the core network with the policy P1, P2 and/or P3. An eNB function may be defined to detect IP flow filters, perhaps for example if IP flows may be used to describe the policies. The Quality of Service Class Identifier (QCI) number may indicate the level of priority, where in some embodiments for example QCI 1 may be the highest priority and QCI 9 may be the lowest priority.

The WTRU may use the policy based access control bitmap, the priority factor, the barring factor, and/or the barring time to perform access control. For example, a WTRU may receive the bitmap [bit(P1)=1, bit(P2)=0, bit (P3)=0]. The WTRU may receive an access control activation flag. The WTRU may activate access control, perhaps for example upon receiving the access control activation flag and/or the policy bitmap. With bit (P1) set to 1, the WTRU may prioritize traffic data packets which match the criteria defined by policy P1. The WTRU may bar (or set to a lower relative priority other traffic than that corresponding to P1, perhaps for example while the access control may be active.

A WTRU may receive from the network the bit that corresponds to the policy being prioritized for access. The WTRU may receive from the network the bit that may correspond to a policy to be used to the WTRU for access. The WTRU may receive an access priority factor from the network for one or more, or each, policy P1, P2 and/or P3. The WTRU may draw a random number "rand" that may be uniformly distributed in the range 0≤rand≤1. The WTRU might not prioritize for access the traffic matching the corresponding policy, perhaps for example if the random number is lower than the access priority factor received by the WTRU. The WTRU may prioritize the traffic matching the corresponding policy is for access, perhaps for example if the random number is higher than or equal to the access priority factor. In scenarios where the traffic might not be prioritized, the WTRU may bar (or set to a lower priority) the traffic for access for an amount of time that may, for example, be determined based on the received barring time that, for example, may correspond to the policy being evaluated.

The WTRU may receive an access barring factor for an access to the network for one or more, or each, policy P1, P2 and/or P3. The WTRU might not bar (or might not lower the priority of) the traffic matching the corresponding policy, perhaps for example if the random number is lower than the access barring factor received by the WTRU. The WTRU may bar (or may lower the priority of) the traffic matching the corresponding policy, perhaps for example if the random number is higher than or equal to the access barring factor. For example, the WTRU may bar (or may lower the priority) of the traffic for an amount of time that, for example, may be calculated based on the received barring time that corresponds to the policy being evaluated. The WTRU may prioritize the traffic matching the corresponding policy for access, perhaps for example if the random number is lower than the access priority factor received by the WTRU. The WTRU might not prioritize the traffic matching the corresponding policy for access, perhaps for example if the random number is higher than or equal to the access priority factor. In scenarios in which the traffic might not be prioritized, the WTRU may bar the traffic for access (or lower the priority), perhaps for example, for an amount of time that may be determined based on the received barring time that may correspond to the policy being evaluated.

The WTRU may receive an access barring factor for one or more, or each, policy P1, P2 and/or P3. The WTRU may bar the traffic matching the corresponding policy, perhaps for example if the random number is lower than the access barring factor received by the WTRU. The WTRU may bar the traffic for an amount of time that may, for example, be calculated based on the received barring time that may correspond to the policy being evaluated. The WTRU might not bar the traffic matching the corresponding policy, perhaps for example if the random number is higher than or equal to the access barring factor.

The enforcement within the WTRU of the policy described herein may be realized in the WTRU assess stratum and/or in one or more of the WTRU higher layers, e.g., in the NAS and/or in the IMS layer.

Enhanced QCI based access barring may be provided. The WTRU may enable (e.g., implicitly enable) QCI based access control mechanism, perhaps for example when the network may indicate that there is network congestion. In some embodiments, there may be an explicit indication from the eNB and/or the network to enable the prioritization of one or more QCI bearers.

In scenarios in which the network and/or eNB may explicitly prioritize voice services, for example, among other scenarios, the network may indicate that the bearers with a certain QCI (e.g. QCI 1) for voice might not be backed-off, perhaps where other bearers with other QCI values may be backed-off and/or might not be allowed to make system access (e.g., for a certain period of time). Such embodiments may prioritize voice bearers over bearers containing other types of traffic.

One or more types of congestion indications sent and/or broadcasted by the eNB/network may be provided. The congestions indications may enable (e.g., implicitly enable) a WTRU to prioritize certain QCI bearers. The network may broadcast the level of congestion in the SIB broadcast messages. For example, the network may state the level of congestion in an RRC information element (IE) or SIB IE (e.g., which may be set to 1, 2 or 3). Level 1 may indicate that the network is not congested. Level 2 may indicate that the network is (e.g. relatively) moderately congested. Level 3 may indicate that the network is (e.g., relatively) heavily congested. The WTRU may back-off (e.g., implicitly back-off) and/or may bar access (e.g., which may include implementing ACB) for non-voice bearers and/or may request access to the network for voice calls, perhaps for example when the WTRU may read level 3 congestion. The WTRU may (e.g., implicitly) assume that the network may be congested, perhaps for example when the WTRU may send an RRC request for MO data and it is rejected by the eNB. The WTRU may request access for voice calls which may be accepted by the network.

The network may (e.g., explicitly) indicate the WTRU to prioritize one or more QCI bearers. This notification may be sent to the WTRU in one or more of the following ways: sending an indication in the RRC and/or SIB message with the QCI value or values which have priority, sending an indication that voice and/or some other specific service may be prioritized, and/or the eNB may accept the scheduling request for data radio bearers (DRBs) containing voice packets.

The WTRU may have one or more access barring mechanisms in place. The access barring mechanism may enable the WTRU that may be in a congested network scenario to not send unnecessary connection request(s) to the network, which for example may aggravate the congestion situation in the network. In some embodiments, the network may indicate to the WTRU to use certain mechanisms at a given point in time, for example perhaps if other mechanisms may be available when QCI based access barring is activated. The WTRU may deactivate one or more of the access barring mechanism. The WTRU may keep one or more, or each, of the access baring mechanisms, perhaps for example depending on the level of congestion.

For example, the WTRU may keep each, or a relatively large subset, of the access barring mechanisms activated, perhaps for example if the network may indicate that there is Level 3 congestion in the network. The WTRU may keep apply one or more, or a smaller subset, perhaps for example when a Level 2 congestion is indicated. The network may be able to indicate to the WTRU the mechanisms that may be applied at a point in time.

A WTRU may ask the network to prioritize its access for voice services or some other services, perhaps for example when there is no congestion in the network. This might happen, for example, when the WTRU is in an emergency situation which may be indicated to the network. The network may activate the QCI based access class baring mechanism and/or some other access barring mechanism, perhaps for example to prioritize the requested service, e.g., a voice call. The QCI based access barring that may be requested by one of the WTRUs may apply to one or more, or each, of the other WTRUs under the coverage of that eNB. The voice calls may be prioritized in that cell for a certain period of time, perhaps for example while the emergency WTRU may be making the voice call and/or providing information about its emergency situation. The eNB may revert back to its normal operation, perhaps for example when the WTRU that may have requested the access class barring ends its emergency voice call.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) configured to communicate with a wireless network, the WTRU comprising:
    a memory; and
    a processor configured to:
        receive an indication of a plurality of operator-specific service-based access policies from the wireless network via a non-access stratum (NAS) signaling, wherein each of the plurality of the operator-specific service-based access policies is associated with one or more services;
        identify a first attempt to access the wireless network, the first attempt being for a first service;
        determine that the first attempt for the first service corresponds to a first operator-specific service-based access policy of the plurality of the operator-specific service-based access policies;
        receive access control information from the wireless network;
        determine that a first request corresponding to the first attempt is allowed to be sent to the wireless network based on the first operator-specific service-based access policy and the access control information; and
        transmit the first request to the wireless network based on a determination that the first request corresponding to the first attempt is allowed to be sent to the wireless network based on the first operator-specific service-based access policy and the access control information.

2. The WTRU of claim 1, wherein the processor is configured to:
    identify a second attempt to access the wireless network, the second attempt being for a second service;
    determine that the second attempt for the second service corresponds to a second operator-specific service-based access policy of the plurality of the operator-specific service-based access policies;
    determine that a second request corresponding to the second attempt is allowed to be sent to the wireless network based on the second operator-specific service-based access policy and the access control information; and refrain from transmitting the second request to the wireless network based on the second operator-specific service-based access policy or the access control information.

3. The WTRU of claim 1, wherein the processor is configured to:
identify a second attempt to access the wireless network, the second attempt being for a second service;
determine that the second attempt for the second service corresponds to a second operator-specific service-based access policy of the plurality of the operator-specific service-based access policies;
determine that a second request corresponding to the second attempt is allowed to be sent to the wireless network based on the second operator-specific service-based access policy and the access control information; and
prioritize the first attempt to the wireless network over the second attempt to the wireless network in accordance with the first and the second operator-specific service-based access policies and the access control information.

4. The WTRU of claim 1, wherein the processor is configured to transmit the first request to the wireless network based on the first attempt being associated with the first operator-specific service-based access policy and based on the access control information broadcasted by the wireless network.

5. The WTRU of claim 1, wherein the one or more services associated with the first operator-specific service-based access policy correspond to at least one of an IP flow, an access point name (APN), a quality of service (QOS), a QOS class identifier (QCI), or an application ID.

6. The WTRU of claim 1, wherein the processor is configured to determine that the first attempt corresponds to the first operator-specific service-based access policy in an access stratum (AS) layer.

7. The WTRU of claim 1, wherein the processor is configured to allow to transmit the first request to the wireless network based on the first attempt corresponding to the first operator-specific service-based access policy and the access control information.

8. The WTRU of claim 1, wherein the processor is configured to refrain from transmitting the first request to the wireless network based on the first attempt not corresponding to the first operator-specific service-based access policy and based on the access control information.

9. The WTRU of claim 1, wherein the access control information indicates that the WTRU is subject to access class barring (ACB) restrictions.

10. A method perform by a wireless transmit/receive unit (WTRU) in communication with a wireless network, the method comprising:
receiving an indication of a plurality of operator-specific service-based access policies from the wireless network via a non-access stratum (NAS) signaling, wherein each of the plurality of the operator-specific service-based access policies is associated with one or more services;
identifying a first attempt to access the wireless network, the first attempt being for a first service;
determining that the first attempt for the first service corresponds to a first operator-specific service-based access policy of the plurality of the operator-specific service-based access policies;
receiving access control information from the wireless network;
determining that a first request corresponding to the first attempt is allowed to be sent to the wireless network based on the first operator-specific service-based access policy and the access control information; and
transmitting the first request to the wireless network based on a determination that the first request corresponding to the first attempt is allowed to be sent to the wireless network based on the first operator-specific service-based access policy and the access control information.

11. The method of claim 10, the method comprising:
identifying a second attempt to access the wireless network, the second attempt being for a second service;
determining that the second attempt for the second service corresponds to a second operator-specific service-based access policy of the plurality of the operator-specific service-based access policies;
determining that a second request corresponding to the second attempt is allowed to be sent to the wireless network based on the second operator-specific service-based access policy and the access control information; and
refraining from transmitting the second request to the wireless network based on the second operator-specific service-based access policy or the access control information.

12. The method of claim 10, the method comprising:
identifying a second attempt to access the wireless network, the second attempt being for a second service;
determining that the second attempt for the second service corresponds to a second operator-specific service-based access policy of the plurality of the operator-specific service-based access policies;
determining that a second request corresponding to the second attempt is allowed to be sent to the wireless network based on the second operator-specific service-based access policy and the access control information; and
prioritizing the first attempt to the wireless network over the second attempt to the wireless network in accordance with the first and the second operator-specific service-based access policies and the access control information.

13. The method of claim 10, wherein the method comprises:
transmitting the first request to the wireless network based on the first attempt being associated with the first operator-specific service-based access policy and based on the access control information broadcasted by the wireless network.

14. The method of claim 10, wherein the one or more services associated with the first operator-specific service-based access policy correspond to at least one of an IP flow, an access point name (APN), a quality of service (QOS), a QOS class identifier (QCI), or an application ID.

15. The method of claim 10, wherein the method comprises:
determining that the first attempt corresponds to the first operator-specific service-based access policy in an access stratum (AS) layer.

16. The method of claim 10, wherein the method comprises enforcing the first attempt associated with the first operator-specific service-based access policy at an AS layer.

17. The method of claim 10, wherein the access control information indicates that the WTRU is subject to access class barring (ACB) restrictions.

18. The method of claim 16, wherein the method comprises:

refraining from transmitting the first request to the wireless network based on the first attempt not corresponding to the first operator-specific service-based access policy and based on the access control information.

19. The method of claim 16, wherein the method comprises:
allowing to transmit the first request to the wireless network based on the first attempt corresponding to the first operator-specific service-based access policy and based on the access control information.

* * * * *

UNITED STATES PATENT AND TRADEMARK OFFICE
CERTIFICATE OF CORRECTION

PATENT NO. : 10,925,067 B2  Page 1 of 1
APPLICATION NO. : 16/197867
DATED : February 16, 2021
INVENTOR(S) : Watfa et al.

It is certified that error appears in the above-identified patent and that said Letters Patent is hereby corrected as shown below:

In the Specification

Column 4, Line 32: replace "IX" with -- 1X --

Column 7, Line 12: replace "Bluetooth" with -- Bluetooth® --

Column 7, Line 32: replace "RNC142b." with -- RNC 142b. --

Column 9, Line 64: replace "TP" with -- IP --

Column 9, Line 65: replace "(MTP-HA)" with -- (MIP-HA) --

Column 14, Line 64: replace "may be" with -- maybe --

Column 15, Line 4: replace "S1 AP" with -- S1AP --

Column 15, Line 9: replace "Radom" with -- Random --

Column 15, Line 20: after "may" insert -- be --

Column 19, Line 37: replace "QCT" with -- QCI --

Column 19, Line 67: replace "$0 \leq rand \leq 1$." with -- $0 \leq rand < 1$. --

Signed and Sealed this
Eighth Day of February, 2022

Drew Hirshfeld
*Performing the Functions and Duties of the
Under Secretary of Commerce for Intellectual Property and
Director of the United States Patent and Trademark Office*